United States Patent
Gold

(10) Patent No.: US 6,891,549 B2
(45) Date of Patent: May 10, 2005

(54) SYSTEM AND METHOD FOR EDGE ENHANCEMENT OF IMAGES

(75) Inventor: Yaron I. Gold, Ramat-Hasharon (IL)

(73) Assignee: Applied Materials, Inc., Santa Clara, CA (US)

(*) Notice: Subject to any disclaimer, the term of this patent is extended or adjusted under 35 U.S.C. 154(b) by 136 days.

(21) Appl. No.: 10/045,951

(22) Filed: Jan. 11, 2002

(65) Prior Publication Data

US 2003/0132946 A1 Jul. 17, 2003

(51) Int. Cl.[7] .............................................. G09G 5/00
(52) U.S. Cl. ...................... 345/611; 382/199; 382/254; 382/266; 382/267; 382/268; 382/269; 382/272; 348/625
(58) Field of Search ................................. 345/428, 611, 345/613, 614; 382/199, 254, 266–269, 272; 348/625

(56) References Cited

U.S. PATENT DOCUMENTS

| | | | | |
|---|---|---|---|---|
| 4,853,970 A | * | 8/1989 | Ott et al. | 382/266 |
| 6,094,508 A | * | 7/2000 | Acharya et al. | 382/199 |
| 6,535,632 B1 | * | 3/2003 | Park et al. | 382/164 |
| 6,600,517 B1 | * | 7/2003 | He et al. | 348/625 |
| 2002/0097439 A1 | * | 7/2002 | Braica | 358/3.26 |

* cited by examiner

*Primary Examiner*—Matthew C. Bella
*Assistant Examiner*—Antonio Caschera
(74) *Attorney, Agent, or Firm*—Blakely, Sokoloff, Taylor & Zafman

(57) ABSTRACT

A method for generating an enhanced image includes the steps of: (a) receiving a matrix of pixels representative of an image; (b) generating a gradient image representative of a difference between values of adjacent pixels; (c) calculating a center of mass for each pixel of the gradient image in response to gradient intensity values and location values of neighboring pixels; and (d) generating an enhanced image by modifying intensity values of pixels of the matrix of pixels that are located in a vicinity of local centers of mass in response to intensity values of pixels that are further displaced from the local centers of mass.

28 Claims, 2 Drawing Sheets

SYSTEM AND METHOD FOR EDGE ENHANCEMENT OF IMAGES

FIELD OF THE INVENTION

The present invention relates to systems and methods for enhancing images and especially for systems and methods for enhancing images including fuzzy edges.

BACKGROUND OF THE INVENTION

An Image is a visual stimulus with intensity and/or color varying as a 2-dimensional function of spatial position ($I=I(x,y)$). An image is substantially a continuous function.

In order to allow recording, storage, transmission, and/or manipulation of an image, some kind of abstraction, or representation is needed. A given image may have a plurality of possible representations. A representation can be symbolic (i.e., $I(x,y)=x^2+y$), numerical—a table of numbers representing intensity values, chemical—exposed emulsion on a photographic film, etc.

The act of transforming of an image into one of its representations is referred to as Recording or Acquisition of the Image. Examples: Taking a photograph on film, scanning an image into computer memory, etc. While an image representation can be obtained from an image by recording it, it can also be synthesized, or generated artificially.

Rendering is the act of transforming an image representation into a visible image. Examples: display of a digitally stored image representation on a computer monitor; development of a photographic film; etc. Because a representation is not necessarily unique, and a plurality of (visually similar) images may be identically represented, the rendered image is not necessarily identical to the recorded image, but an approximation thereof. It is also possible to render an image from a synthetic representation. Such rendering can be used to visualize substantially non-visual (non-optical) phenomena. For example, the digitized signal from the detector of a scanning electron microscope (SEM) can be interpreted as a representation of an image, and thus can be rendered.

While an image is substantially continuous, its representation is not necessarily continuous. In particular, a Digital Image is a representation for which the image area is divided into a finite number of small elements referred to as picture elements, or pixels, and a number (with finite precision) is associated with each pixel to represent its intensity.

It is often useful to talk about regions and edges in an image. A Region in an image is a contiguous collection of image positions, which collectively possess a certain (substantially visual) property. Examples of such properties are average intensity, average color, texture or pattern, etc. An Edge in an image is a (substantially contiguous) collection of image positions that corresponds to the border between two adjacent regions. Much of the relevant information content of an image is contained in its edges.

Images contain information. Some of the information contained in an image is more relevant and some is less relevant to the viewer. The more relevant information a user can extract from an image, the more useful the image. One obstacle for extracting relevant information is noise. Noise in an image consists of variations in image intensity (or other property) which do not carry information that is relevant to the viewer. Noise often makes it more difficult for the viewer to extract the relevant information from the image. An image may become contaminated with noise during acquisition, manipulation and/or rendering.

A distinction is made between Fuzzy and Distinct edges. An edge in an image is fuzzy if a substantial amount of pixels near the edge and in one region are closer in property value to that of the other region, and vice versa. An edge is distinct, or sharp if the amount of such pixels is not substantial. An edge may be fuzzy due to inaccurate acquisition, to added (superimposed) noise, to certain filtering (convolution, blurring), or to other manipulations. Edge information is more difficult to extract from fuzzy edges.

Although the human visual system can extract information from images that are noisy, have fuzzy edges, or are otherwise less than ideal, it is possible to help it by enhancing the image. Image Enhancement is a transformation of an image (usually by manipulation of its representation) in order to obtain a substantially similar image that allows better visibility of certain aspects or components of the original image, thus allowing better and/or easier extraction of information relevant to the viewer.

Example: If a priori knowledge about a noisy image states that the spatial frequency of the noise is higher than that of the relevant information, one may apply a low-pass spatial filter in order to improve the ratio between relevant information (signal) and noise (signal-to-noise ratio, or SNR).

Another example: a plurality of representations of the same image, each containing independent noise with certain characteristics, can be averaged pixel-wise to improve SNR.

An image with fuzzy edges may be enhanced to obtain a similar image in which the edges are more distinct. Methods of this kind of enhancement are the subject of this invention.

Prior art smoothing techniques are discussed at chapter 3 of "The image processing handbook" by John C. Russ, CRC press 1994.

Noise reduction methods, such as smoothing and averaging out on one hand, and prior art edge enhancement and image sharpening methods on the other hand, are often contradictory in the sense that applying one increases the need for the other. Prior art methods often do not provide sufficiently visible images in cases where an image is both noisy and includes fuzzy edges.

Scanning electron microscopes are known in the art. U.S. Pat. No. 5,659,172 of Wagner describes a method for reliable defect detection using multiple perspective scanning electron microscope images. Scanning electron microscope images are generated by irradiating an inspected object with an electron beam, collecting signals resulting from an interaction of the electron beam with a portion of the surface of the inspected object and processing the collected signals. A magnification can be achieved if the electron beam is utilized to generate an image of a portion of the object that is smaller than the cross section of electron beam. A disadvantage of such a magnification is that the electron beam also interacts with other portions of the inspected object, and as a result the collected signals include unnecessary information that cannot be filtered out. In many cases this unnecessary information causes the image to include fuzzy edges.

There is a need to provide systems and methods for image enhancement of images that include fuzzy edges.

There is a need to provide systems and methods for image enhancement of images that are generated by scanning electron microscope imaging methods.

There is a need to provide systems and methods for image enhancement of images that are generated by scanning electron microscope imaging methods involving magnifications and especially large magnifications of an image.

SUMMARY OF THE INVENTION

The invention provides a method for generating an enhanced image, the method including the steps of: (a) receiving a matrix of pixels with intensity values, representative of an image; (b) generating a matrix of values representative of the estimated relevant edges in the image; (c) generating an enhanced image represented by a matrix of pixels such that pixel locations in a vicinity of a relevant edge are populated by values that are in response to intensity values of pixels that are further displaced from the relevant edge.

The invention provides a method for generating an enhanced image, the method including the steps of: (a) receiving a matrix of pixels representative of an image; (b) generating a gradient image which is a matrix of values representative of a difference between values of adjacent pixels; (c) calculating a center of mass for each pixel location of the gradient image in response to gradient intensity values and location coordinates of neighboring pixels; and (d) generating an enhanced image by modifying intensity values of pixels of the matrix of pixels that are located in a vicinity of local centers of mass in response to intensity values of pixels that are further displaced from the local centers of mass.

The invention provides a method for generating an enhanced image, the method including the steps of: (a) receiving a matrix of pixels representative of an image; (b) estimating at least one edge of the image; and (c) generating an enhanced image by modifying intensity values of pixels of the matrix of pixels that are located in a vicinity of that at least one estimated edge in response to intensity values of pixels that are further displaced from that at least one edge.

The invention provides a method for estimating a relevant edge of an image, the method including the steps of: (a) receiving a matrix of pixels representative of an image; (b) generating a gradient image representative of a difference between values of adjacent pixels; (c) calculating a center of mass for each pixel of the gradient image in response to gradient intensity values and location coordinates of neighboring pixels; and (d) estimating a location of a edge in response to the center of mass.

The step of generating a gradient image is preceded by a step of smoothing the image. The image can be smoothed to decrease noise magnification resulting from the step of generating the gradient image. The step of smoothing may include applying a kernel operation on the pixels of the image The steps of smoothing and the step of generating a gradient image including applying a Canny filter on the pixels of the image.

Neighboring pixels are defined as pixels within a neighborhood pattern. The neighborhood pattern may be of various shapes, such as a cross, a diamond, a rectangle, or an octagonal region, and may have various characteristics, such being either symmetric around the pixel or asymmetric around the pixel.

The neighboring pattern can be utilized to define a vicinity of a pixel. For example, a local center of mass is located in a vicinity of a pixel if a distance between the pixel and at least a portion of the local center of mass does not exceed (i) a length of the neighborhood pattern, (ii) half a length of the neighborhood pattern, or if the pixel and at least a portion of the local center of mass are located within at least one single neighborhood pattern.

The invention provides a method in which the size of the neighboring pattern may be changed during consecutive iterations of the method.

The invention provides a method in which a center of mass may be calculated by the steps of: (a) generating a sum result by summing results of a multiplication between an intensity value of a neighbor pixel and a location coordinate value of the neighbor pixel, for each neighbor pixel; and (b) dividing the sum result by a sum of gradient intensity values of all neighbor pixels. It is noted that a location coordinate value reflects a displacement from either the center of a neighborhood, or the gradient image origin.

The invention provides a method in which a numerical measure of the size of an object within the matrix of pixels is calculated in response to the matrix of displacements from the local centers of gradient mass.

The invention provides a method that limits or even prevents a modification of pixel values that are located in a vicinity of small objects.

The invention provides a method in which the step of modifying may involve replacing pixel values of pixels that are located in a vicinity of local centers of mass with pixel values of pixels that are further displaced from the local centers of mass. The step of generating an enhanced image may include a selection of a pixel further displaced from a local center of mass for each pixel located in the vicinity of the local center of mass. The selection may be responsive to at least one of the following parameters: (a) a displacement of a center of mass and the pixel located in the vicinity of the center of mass, or (b) weight factor. The weight factor may be responsive to size of an object delimited by local centers of mass.

BRIEF DESCRIPTION OF THE DRAWINGS

Reference is made to the attached drawings, wherein elements having the same reference numeral designations represent like elements throughout, and wherein.

DETAILED DESCRIPTION OF PREFERRED EMBODIMENTS

For convenience of explanation, the following detailed description and associated drawings refer to systems and method for edge enhancement of images. It is noted that the invention is not limited to said signals and specification and can be implemented on various devices without falling out of the true spirit of the invention.

Figure 1:
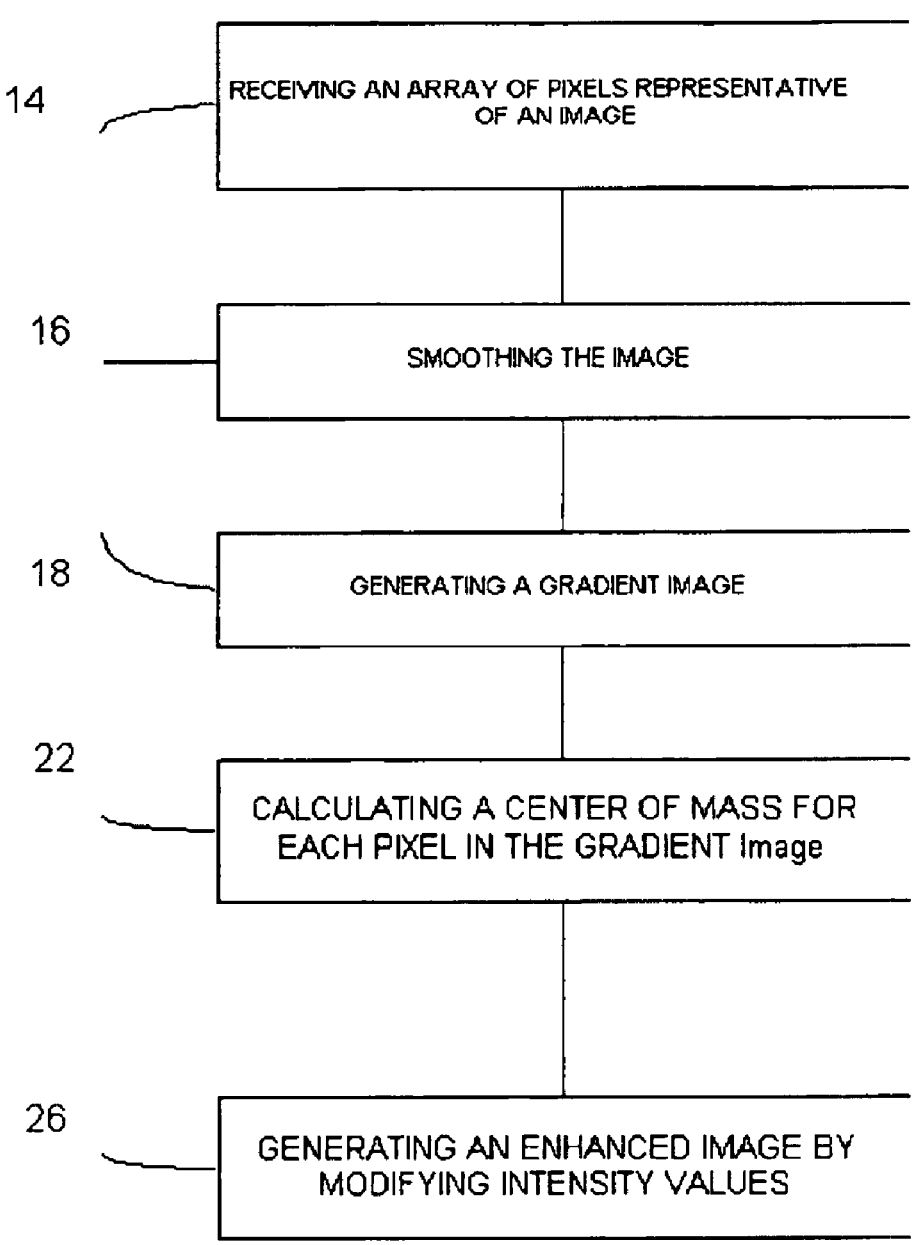
FIGS. 1–2 are flow charts illustrating methods 10 and 30 for generating an enhanced image, in accordance to preferred embodiment of the invention.

FIG. 1 is a flow chart of method 10 of generating an enhanced image in accordance with a preferred embodiment of the invention.

Method 10 starts by step 14 of receiving an array of pixels representative of an image. It is assumed, for convenience of explanation, that the array of pixels includes 480 rows and 480 columns, the pixels are generated by a scanning electron microscope such as Applied Materials CD-SEM.

Step 14 is followed by step 18 of generating a gradient image representative of a difference between values of adjacent pixels. The 480×480 array of pixels is converted to a gradient array that includes 480×480 pixels. Each pixel value of the gradient images is responsive to two values—a horizontal value and a vertical value. The horizontal value represents a difference between the pixel's value and a value of an horizontally adjacent pixel. The vertical value that represents a difference between the pixel's value and a value of an vertically adjacent pixel. It is noted that the gradient image can reflect a difference between a given pixel and more than another near pixel and that a single value and more than two values can reflect a difference between a given pixel and other pixels. The calculation of the vertical and horizontal values is relatively easy and requires a relatively simple addressing scheme.

Conveniently, step 18 is preceded by step 16 of smoothing the image. Step 16 is aimed to reduce noise amplifications resulting from the generation of the gradient image. Preferably, step 16 and 18 are combined by applying a Canny filter on the pixels of the image. Canny filters are known in the art. A Canny filter can be described as a convolution of a Gaussian operator and a step operator. A Gaussian operator is a set of integers that approximate the profile of a Gaussian function along any row, column or diagonal.

Step 18 is followed by step 22 of calculating a center of mass for each pixel of the gradient image in response to gradient intensity values and location coordinate values of neighboring pixels. Neighboring pixels of a pixel are located near that pixel. Usually the neighboring pixels form a neighborhood pattern. The neighborhood pattern is usually symmetric around a pixel, but this is not necessary. Commonly used neighborhood patterns include a cross, a diamond, a square and an octagonal region.

For ease of calculation and addressing, step 22 is also conducted in two stages. During the first stage a horizontal center of mass and a horizontal center of mass displacement are calculated for each pixel of the gradient image. During a second stage a vertical center of mass and vertical center of mass displacement are calculated for each pixel of the gradient image.

A vertical center of mass of a pixel of the gradient image is responsive to values of neighboring pixels and to the absolute or relative vertical position of these neighboring pixels. A horizontal center of mass of a pixel of the gradient image is responsive to values of neighboring pixels and to the absolute or relative horizontal position of these neighboring pixels.

Conveniently, these mentioned above calculation can be defined as performing the following kernal operation:

$$CMV_{X,Y} = \frac{\sum_{I,J \in NB_{X,Y}} V_{I,J} * DV_{I,J}}{\sum_{I,J \in NB_{X,Y}} V_{I,J}} \quad (i)$$

$$CMH_{X,Y} = \frac{\sum_{I,J \in NB_{X,Y}} V_{I,J} * DH_{I,J}}{\sum_{I,J \in NB_{X,Y}} V_{I,J}} \quad (ii)$$

Whereas $CMV_{X,Y}$ and $CMH_{X,Y}$ are respectively the vertical center of mass value and the horizontal center of mass value of the (x,y)'th pixel of the gradient image. $NB_{X,Y}$ includes all the neighboring pixel of the (x,y)'th pixel. $V_{I,J}$ are the values of an (i,j)'th pixel, the (i,j) pixel being a neighbor pixel to the (x,y) pixel. $DV_{i,j}$ and $DH_{i,j}$ being the vertical and horizontal displacement, accordingly, of the (i,j)'th pixel. $DV_{i,j}$ can reflect a displacement from the origin of the gradient array, a displacement from a predefined edge of a neighboring pattern, and the like.

Step 22 is followed by step 26 of generating an enhanced image by modifying intensity values of pixels that are located in a vicinity of local centers of mass in response to intensity values of pixels that are further displaced from the local centers of mass. The modification can be made by a replacement of pixel values, but this is not necessarily so.

Figure 2:
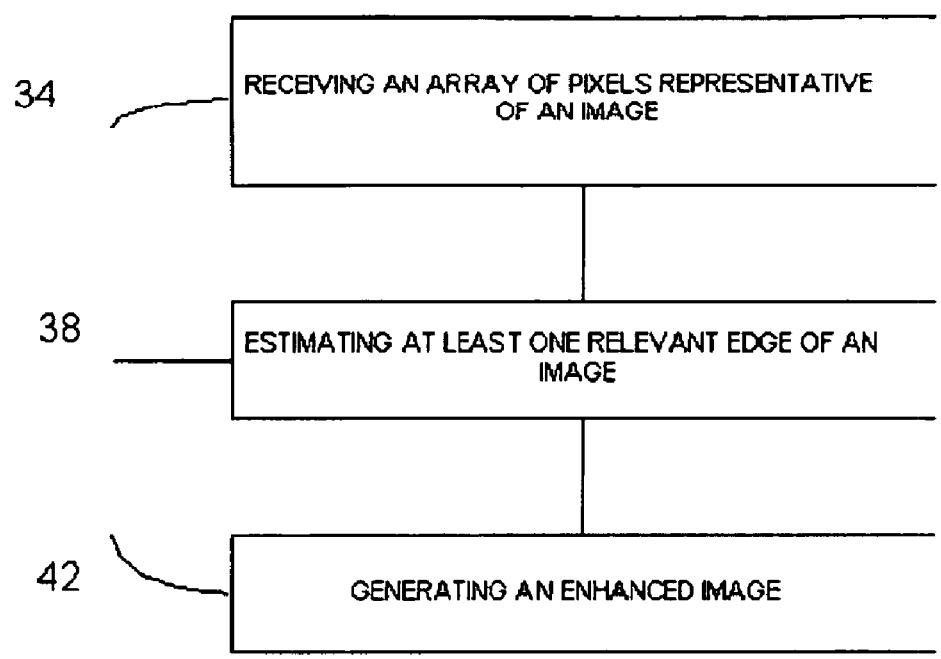

FIG. 2 is a flow chart of method 30 of generating an enhanced image in accordance with a preferred embodiment of the invention.

Method 30 starts by step 34 of receiving an array of pixels representative of an image.

Step 34 is followed by step 38 of estimating at least one relevant edge of an image. The estimation can be done by generating a gradient image, calculating a center of mass, but this is not necessarily so, and prior art methods for edge estimation, such as those described in Ch. 3 of "The image processing handbook" by John C. Russ, CRC press 1994, and other prior art methods can be utilized.

Step 38 is followed by step 42 of generating an enhanced image by modifying intensity values of pixels that are located in a vicinity of estimated relevant edges in response to intensity values of pixels that are further displaced from the corresponding estimated relevant edges. The modification can be made by a replacement of pixel values, but this is not necessarily so.

It will be apparent to those skilled in the art that the disclosed subject matter may be modified in numerous ways and may assume many embodiments other then the preferred form specifically set out and described above.

Accordingly, the above disclosed subject matter is to be considered illustrative and not restrictive, and to the maximum extent allowed by law, it is intended by the appended claims to cover all such modifications and other embodiments, which fall within the true spirit and scope of the present invention.

The scope of the invention is to be determined by the broadest permissible interpretation of the following claims and their equivalents rather then the foregoing detailed description.

What is claimed is:

1. A method for generating an enhanced image, the method comprising the steps of:
   (a) receiving a matrix of pixels representative of an image;
   (b) generating a gradient image, the gradient image comprises a matrix of values, representative of a difference between values of adjacent pixels;
   (c) calculating a center of mass for each pixel of the gradient image in response to gradient intensity values and location values of neighboring pixels; and
   (d) generating an enhanced image by modifying intensity values of pixels of the matrix of pixels that are located in a vicinity of local centers of mass in response to intensity values of pixels that are further displaced from the local center of mass;
   wherein neighboring pixels of each pixel of the gradient image comprise pixels within a neighborhood pattern and a pixel is located in the vincinity of local center of mass if a distance between the pixel and at least a portion of the local center of mass does not exceed a length of the neighborhood pattern.

2. The method of claim 1 wherein the step of generating gradient image is preceded by a step of smoothing the image.

3. The method of claim 2 wherein the image is smoothed to decrease noise magnification resulting from the step of generating the gradient image.

4. The method of claim 2 wherein the step of smoothing and the step of generating the gradient image comprising applying a Canny filter on the pixels of the image.

5. The method of claim 2 wherein the step of smoothing comprising applying a kernel operation on the pixels of the image.

6. The method of claim 1 wherein the neighboring pattern is symmetric around the pixel.

7. The method of claim 1 wherein the neighborhood pattern is asymmetric around the pixel.

8. The method of claim 1 wherein the neighborhood pattern is selected from a list consisting of a cross, a diamond, a rectangle and an octagonal region.

9. The method of claim 1 wherein a pixel is located in a vicinity of local center of mass if the pixel and at least a portion of the local center of mass are located within at least one single neighborhood pattern.

10. The method of claim 1 wherein step (d) is followed by a step (f) of changing the neighborhood pattern and wherein step (f) is followed by step (c).

11. The method of claim 10 wherein the changing comprising changing the size of the neighborhood pattern.

12. The method of claim 11 wherein a location value reflects a displacement from a pixel selected from a group consisting of a local center of mass and the gradient image origin.

13. The method of claim 12 wherein limiting a modification of pixel values that are located in a vicinity of small objects.

14. The method of claim 12 wherein preventing a modification of pixels values that are located in a vicinity of small objects.

15. The method of claim 1 wherein the step of calculating a center of mass of a pixel of the gradient image comprising the steps of: generating a sum result by summing results of a multiplication between a intensity value of a neighbor pixel and a location value of the neighbor pixel, for each neighbor pixel; and dividing the sum result by a sum of gradient intensity values of all neighbor pixels.

16. The method of claim 1 wherein the center of mass reflects a size of an object within the matrix of pixels.

17. The method of claim 1 wherein the step of generating an enhanced image comprising replacing pixel values of pixels that are located in a vicinity of local centers of mass with pixel values of pixels that are further displaced from the local centers of mass.

18. The method of claim 1 wherein the step of generating an enhanced image comprising a step of selecting a pixel further displaced form a local center of mass for each pixel located in the vicinity of the local center of mass.

19. The method of claim 18 wherein the selection is responsive to a displacement of a center of mass and the pixel located in the vicinity of the center of mass.

20. The method of claim 19 wherein the selection is further responsive to a weight factor.

21. The method of claim 20 wherein the weight factor is responsive to size of an object delimited by local centers of mass.

22. The method of claim 1 wherein the image is generated by a scanning electron microscope.

23. The method of generating an enhanced image, the method comprising the steps of (a) receiving a matrix of pixels representative of an image;

(b) generating a gradient image;

(c) calculating a center of mass for each pixel of the gradient image in response to gradient intensity values and location values of neighboring pixels;

(d) generating an enhanced image by modifying intensity values of pixels of the matrix of pixels that are located in a vicinity of the gradient image in response to intensity values of pixels that are further displaced from the gradient image;

wherein the neighborhood pixels of each pixel of the gradient image comprise pixels within a neighborhood pattern that is symmetric around the pixel, and the pixel is located in a vicinity of the gradient image if a distance between the pixel and the gradient image does not exceed a length of the neighborhood pattern.

24. The method of claim 23 wherein the step of generating the gradient image is proceeded by a step of smoothing the image.

25. The method of claim 23 wherein the step of generating the enhanced image is followed by a step of changing the neighborhood pattern and wherein the step of changing the neighborhood pattern is followed by the step of generating a gradient image.

26. The method of claim 23 wherein the step of calculating a center of mass of a pixel of the gradient image comprising the steps of: generating a sum result by summing results of a multiplication between a intensity value of a neighbor pixel and a location value of the neighbor pixel, for each neighbor pixel; and dividing the sum result by a sum of gradient intensity values of all neighbor pixels.

27. The method of claim 23 wherein the step of generating an enhanced image comprising replacing pixel values of pixels that are located in a vicinity of an edge with pixel values of pixels that are further displaced from the edge.

28. The method of claim 23 wherein the image is generated by a scanning electron microscope.

* * * * *